Aug. 21, 1928.  1,681,203
N. H. WESTERBERG
STUD SETTING AND LOOSENING TOOL
Filed Dec. 1, 1924
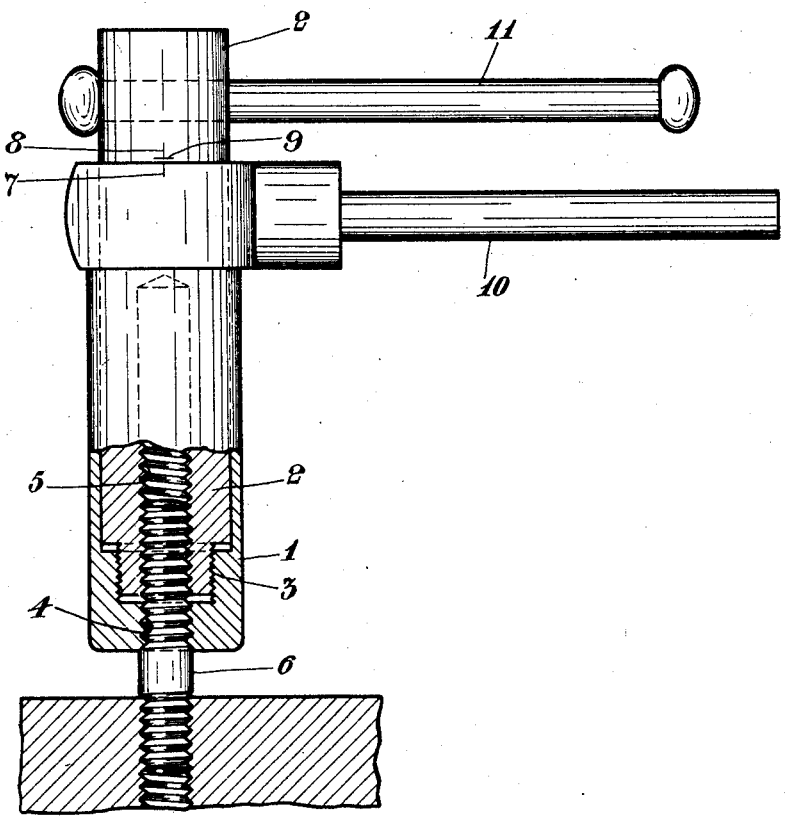
Inventor:
Nils Halvar Westerberg
By George Bayard Jones
Atty.

Patented Aug. 21, 1928.

1,681,203

UNITED STATES PATENT OFFICE.

NILS HALVAR WESTERBERG, OF HJORTHAGEN VARTAN, SWEDEN.

STUD SETTING AND LOOSENING TOOL.

Application filed December 1, 1924, Serial No. 753,059, and in Sweden December 10, 1923.

The present invention relates to a tool by means of which it is possible in an easy and simple manner to set or fasten as well as to loosen threaded studs without damaging or deforming the threads on the studs in any manner. The improved tool consists principally of two members provided with screw-threaded holes for receiving the stud and also provided with handles, said members being connected with or journaled in one another in such manner that when turned relatively to one another they will be jammed on to the stud screwed into the holes in the members. When the members have been so jammed on to the stud the tool may be rotated, together with the stud, by the aid of the handles, for the purpose of screwing the stud into or out from the member or part to or from which the stud is to be fastened or loosened. The said two members of the tool are preferably connected to one another by means of threads which may be of a smaller pitch, for instance, than the threads on the stud and in the holes for the same in the members.

The accompanying drawing illustrates, partly in section, a tool according to the invention.

Referring to the drawing, the tool consists of two members or portions 1 and 2. In the embodiment illustrated the member 2 is provided with a portion of reduced diameter having external threads 3 by means of which said member 2 is screwed into a correspondingly threaded recess in the member 1 and thus joined to said member. Each of said members 1 and 2 is provided with a hole or bore 4 and 5, respectively, which is threaded internally to receive the stud. At least in one mutual position of the members 1 and 2 said bores 4 and 5 are conaxial to each other, and in such position the threads in one member form a continuation of the threads in the other member, so that a stud 6 may be screwed into the threaded holes 4 and 5. The said mutual position of the members 1 and 2 is indicated by the marks 7 and 8 on said members which marks come opposite each other in such position, whilst the mark 9 on the member 2 comes flush with the upper edge of the member 1.

When the stud 6 has been screwed into the members 1 and 2 while these members occupy the above-mentioned mutual position, said two members are turned relatively to one another by means of the handle 10 on the member 1 and the handle 11 which is slidable in an aperture in the upper end of the member 2. Owing to such turning of the members 1 and 2 relatively to each other the stud 6 will obviously be jammed, particularly when, as shown, the pitch of the threads 3 joining the two members is smaller than the pitch of the threads on the stud 6. When the stud has been jammed in this manner it may be screwed by means of the tool into or out of the member or part to which it is to be fastened, or from which it is to be loosened, the tool being turned by means of the handle 11, whilst the handle 10 may suitably be removed, particularly if it proves to be an obstacle to the turning of the tool.

It will be understood that the invention is not limited to the embodiment above described and illustrated in the drawing. Though it is preferred to connect or join the members 1 and 2 by means of a thread 3 which is conaxial to the threads in the holes for the stud in the members, and has the same direction but a smaller pitch than said thread in said holes, it is obviously possible, for instance, instead to give the firstmentioned thread an opposite direction, or to make the same of a larger pitch than the thread on the stud, or to make the same eccentric to the holes for the stud. It would also be possible to do without the thread 3, and other similar changes and modifications may be made within the scope of the invention.

I claim:

1. A tool for fastening and loosening studs, comprising two members provided with screw-threaded holes for receiving a stud, and each provided with a handle the threads of said holes being of the same pitch, said members being joined by means of screw-threads in such manner that by being turned in relation to one another they will be jammed onto a stud screwed into the holes in the members.

2. A tool for fastening and loosening studs, comprising two members provided with screw-threaded holes for receiving a stud, and each provided with a handle the threads of said holes being of the same pitch, said members being joined by means of screw-threads in such manner that by being turned in relation to one another they will be jammed onto a stud screwed into the holes in the members, the screw-thread joining said members having a smaller pitch than the pitch of the thread in the holes in the members for the stud.

3. A tool for fastening and loosening threaded studs comprising two members each provided with an operating handle and a threaded opening, the openings being adapted to receive a threaded stud, said members being joined by means of screw threads in such manner that by being turned in relation to one another the threads of said openings will be jammed with the threads of a stud screwed into said openings whereby said stud will be rotated with said members.

4. A tool for fastening and loosening threaded studs comprising two members each provided with an operating handle and an opening having a diameter and threads adapted to receive a stud, said members being connected by one to the other by additional coacting threaded portions, the pitch of which latter threads is less than the pitch of the threads of said openings whereby movement of one of said members relatively to the other will cause the threads of said members to jam with the threads of a stud screwed into said opening, and thereby cause said stud to turn with said members upon rotation of the latter.

NILS HALVAR WESTERBERG.